US012599146B2

(12) United States Patent
Castro et al.

(10) Patent No.: US 12,599,146 B2
(45) Date of Patent: Apr. 14, 2026

(54) PREPARATION OF FAT-BASED CONFECTIONS

(71) Applicant: MARS, INCORPORATED, McLean, VA (US)

(72) Inventors: Armando J. Castro, Westchester, IL (US); Barry David Glazier, Elizabethtown, PA (US); Eyal M. Ben-Yoseph, Long Valley, NJ (US); Chia-Hua Hsu, Glenview, IL (US); Sara Kelley, Carlisle, PA (US); Emine Unlu, Chicago, IL (US); Neil A. Willcocks, Glencoe, IL (US); Thomas M. Collins, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 31 days.

(21) Appl. No.: 17/632,486

(22) PCT Filed: Aug. 3, 2020

(86) PCT No.: PCT/US2020/044804
§ 371 (c)(1),
(2) Date: Feb. 2, 2022

(87) PCT Pub. No.: WO2021/026103
PCT Pub. Date: Feb. 11, 2021

(65) Prior Publication Data
US 2022/0279809 A1     Sep. 8, 2022

Related U.S. Application Data

(60) Provisional application No. 62/961,578, filed on Jan. 15, 2020, provisional application No. 62/961,562, filed on Jan. 15, 2020, provisional application No. 62/881,983, filed on Aug. 2, 2019.

(51) Int. Cl.
| A23G 1/46 | (2006.01) |
| A23G 1/00 | (2025.01) |
| A23G 1/30 | (2006.01) |
| A23G 1/48 | (2006.01) |
| A23G 3/40 | (2006.01) |
| A23G 3/48 | (2006.01) |
| A23G 9/32 | (2006.01) |

(52) U.S. Cl.
CPC ............. *A23G 1/46* (2013.01); *A23G 1/0026* (2013.01); *A23G 1/305* (2013.01); *A23G 1/48* (2013.01); *A23G 3/40* (2013.01); *A23G 3/48* (2013.01); *A23G 9/32* (2013.01)

(58) Field of Classification Search
CPC .......... A23G 1/46; A23G 1/0026; A23G 1/48; A23G 3/40; A23G 3/48; A23G 9/32; A23G 1/0033; A23G 1/0016; A23G 3/36; A23G 3/38; A23G 4/06
See application file for complete search history.

(56) References Cited

U.S. PATENT DOCUMENTS

| 2,348,837 | A | | 5/1944 | Ernst | |
| 3,702,252 | A | * | 11/1972 | Veltman | A23G 3/0231 |
| | | | | | 426/660 |
| 4,346,121 | A | * | 8/1982 | Turos | A23G 1/047 |
| | | | | | 426/585 |
| 5,869,542 | A | | 2/1999 | Davies | |
| 5,882,709 | A | * | 3/1999 | Zumbe | A23G 1/047 |
| | | | | | 426/660 |
| 6,159,526 | A | | 12/2000 | Morikawa | |
| 9,332,776 | B1 | | 5/2016 | Beetz | |
| 10,280,095 | B1 | | 5/2019 | Garudachari | |
| 2006/0286200 | A1 | | 12/2006 | Castro | |
| 2011/0189298 | A1 | | 8/2011 | Vos | |
| 2020/0315103 | A1 | * | 10/2020 | Leo | A01G 9/246 |
| 2022/0312791 | A1 | * | 10/2022 | Dupas-Langlet | A23G 1/423 |

FOREIGN PATENT DOCUMENTS

| CN | 103533841 | A | | 1/2014 | | |
| CN | 105208875 | A | | 12/2015 | | |
| CN | 108347962 | A | | 7/2018 | | |
| EP | 0522704 | A2 | | 1/1993 | | |
| EP | 0891716 | A1 | | 1/1999 | | |
| EP | 3114939 | B1 | | 2/2018 | | |
| EP | 3501290 | A1 | | 6/2019 | | |
| GB | 1510143 | A | | 5/1978 | | |
| GB | 2468692 | A | | 9/2010 | | |
| JP | 2004123839 | A | * | 4/2004 | | |
| WO | WO-2020225056 | A1 | * | 11/2020 | | A23G 1/48 |
| WO | WO-2021018700 | A1 | * | 2/2021 | | A23G 3/46 |
| WO | WO-2021074271 | A1 | * | 4/2021 | | A23G 1/02 |

OTHER PUBLICATIONS

JP2004123839 A (Clarivate machine translation) (Year: 2004).*
Anonymous, Effect of drying methods on the quality of powdered cocoa pulp juice, Jan. 2006, XP055663581, NA.

(Continued)

*Primary Examiner* — Nikki H. Dees
*Assistant Examiner* — Andrew E Merriam
(74) *Attorney, Agent, or Firm* — Fish & Richardson P.C.

(57) ABSTRACT

The present disclosure is directed to a novel method of preparing fat-based confectionery products.

10 Claims, 5 Drawing Sheets

(56)          References Cited

OTHER PUBLICATIONS

Chin et al., Effect of drying methods on the quality of powdered cocoa pulp juice, Proceedings 4th Malaysian International Cocoa Conference, 2006, 2 pages, Malaysian Cocoa Board, MY.

Chin, H.H., Effect of drying methods on the quality of powdered cocoa pulp juice, Effect of drying methods on the quality of powdered cocoa pulp juice, Dec. 2006, p. 1.

Declercq et al., Process for Extracting Sugars from Cocoa Pulp, Process for Extracting Sugars from Cocoa Pulp, Oct. 2012, pp. 872-879, vol. 582, No. 84.

Escalante et al., Production and quality characterization of pulp from cocoa beans from Trinidad: Effects of varying levels of pulp on value-added carbonated cocoa beverages, Proc Caribbean Food Crops Society, 2013, 49:279-296.

Jayeola et al., Production of Bioactive Compounds From Waste, Production of Bioactive Compounds From Waste, Jan. 2018, 317-340, NA, Therapeutic, Prubiotic, and Unconventional Foods.

Ramlan et al., Polytetrafluoroethylene (PTFE) modified surfaces targeted to reduce powder stickiness in spray drying process, 11th MIFT National Food Science and Technology Competition, Apr. 19, 2019, p. 1-10.

* cited by examiner

Lens: Z100:X300
Tilt angle: 0
100.0µm

PREPARATION OF FAT-BASED CONFECTIONS

BACKGROUND

The preparation of fat-based confectionery products is a complex and labor-intensive process involving numerous pieces of equipment and material.

Accordingly, there is a need for a simplified alternative process for making fat-based compositions.

BRIEF DESCRIPTION

The present disclosure is directed to methods of making fat-based confectionery compositions primarily or wholly within in a spray dryer or similar system.

Traditional chocolate making methods are time and labor intensive and involve the use of many different pieces of equipment. By eliminating the need for milling, conching and/or other steps in the process, this novel method allows for chocolate and other fat-based confectionery to be prepared in locations where it is impractical or financially not viable to establish large manufacturing lines with several pieces of equipment.

_Theobroma cacao_, the source of the beans used in making chocolate, only grows in a limited area of the world, often in areas without easy access or ability to establish large manufacturing facilities. Among other benefits, making chocolate primarily in a spray dryer using these novel methods would allow small batch and specialty chocolate to be made in origin.

In light of the disclosure herein and without limiting the disclosure in any way, in a first aspect of the present disclosure, which may be combined with any other aspect listed herein unless specified otherwise, provided herein is a method of preparing confectionery compositions, wherein the composition is prepared by creating a water in fat emulsion within a spray dryer.

In a second aspect of the present disclosure, which may be combined with any other aspect listed herein unless specified otherwise, the method comprises spray drying ingredients and centrifuging the resulting spray dried material.

In a third aspect of the present disclosure, which may be combined with any other aspect listed herein unless specified otherwise, the composition does not comprise any added sugar.

In a fourth aspect of the present disclosure, which may be combined with any other aspect listed herein unless specified otherwise, provided herein is a method of manufacturing a food or confectionery ingredient comprising spray drying a fruit or vegetable product with a carrier.

In a fifth aspect of the present disclosure, which may be combined with any other aspect listed herein unless specified otherwise, provided herein is a method of manufacturing a food or confectionery ingredient comprising spray drying cacao pulp with a carrier.

In a sixth aspect of the present disclosure, which may be combined with any other aspect listed herein unless specified otherwise, the carrier is cocoa powder, cocoa pod fiber, cocoa butter or another product derived from a cocoa pod. The cocoa powder may be fermented and roasted, or raw, dried, germinated or malted.

In a seventh aspect of the present disclosure, which may be combined with any other aspect listed herein unless specified otherwise, the spray drying occurs at an inlet temperature of 120° C. to 180° C.

In an eighth aspect of the present disclosure, which may be combined with any other aspect listed herein unless specified otherwise, the spray drying occurs at an outlet temperature of 60° C. to 100° C.

In a ninth aspect of the present disclosure, which may be combined with any other aspect listed herein unless specified otherwise, the spray drying occurs in a spray dryer coated with polytetrafluroethylene.

In a tenth aspect of the present disclosure, which may be combined with any other aspect listed herein unless specified otherwise, the confectionery compositions produced by the methods disclosed herein are fat-based confectionery compositions.

In an eleventh aspect of the present disclosure, which may be combined with any other aspect listed herein unless specified otherwise, the confectionery compositions produced by the methods disclosed herein are non-fat based confectionery compositions.

In a twelfth aspect of the present disclosure, which may be combined with any other aspect listed herein unless specified otherwise, the confectionery compositions produced by the methods disclosed herein are coatings.

In a thirteenth aspect of the present disclosure, which may be combined with any other aspect listed herein unless specified otherwise, the confectionery compositions produced by the methods disclosed herein are ice creams.

In a fourteenth aspect of the present disclosure, which may be combined with the thirteenth aspect in combination with any other aspect listed herein unless specified otherwise, methods of producing fat-based confectionary compositions without milling or conching are provided.

In a fifteenth aspect of the present disclosure, which may be combined with any other aspect listed herein unless specified otherwise methods of producing fat-based confectionary compositions with minimal milling or conching are provided.

In a sixteenth aspect of the present disclosure, which may be combined with any other aspect listed herein unless specified otherwise, fruit confections comprising fruit material dispersed with cocoa butter are provided.

In a seventeenth aspect of the present disclosure, which may be combined with any other aspect listed herein unless specified otherwise, the dispersion of the fruit material with the cocoa butter is achieved through spray drying.

In an eighteenth aspect of the present disclosure, which may be combined with any other aspect listed herein unless specified otherwise, the fruit confection has a particle size of 30 microns or less.

In a nineteenth aspect of the present disclosure, which may be combined with any other aspect listed herein unless specified otherwise, the fruit confection and cocoa butter are spray dried with cocoa liquor.

In a twentieth aspect of the present disclosure, which may be combined with any other aspect listed herein unless specified otherwise, confectionary compositions produced by the methods disclosed herein have a particle size of 30 micron or less.

In a twenty-first aspect of the present disclosure, which may be combined with any other aspect listed herein unless specified otherwise, the methods disclosed herein may be used to make fat-based confections incorporating pressed or cold-pressed juice from fresh cacao beans, pressed or cold-pressed juice of cacao husk, or pressed or cold-pressed juice of cacao placenta, all of which can be further concentrated by heating, evaporation, membrane filtration, or other concentration methods prior to incorporation into fat-based confections. Additional materials that may be spray dried into the fat-based confections of the present method, include cold pressed or pressed cacao pulp (with juice and solid components processed either together or separately), fermented cacao pulp, and cacao pulp vinegar. These materials may also be homogenized, filtered, pressed or further concentrated by heating, evaporation, membrane filtration or other concentration techniques. Fermented cacao pulp may also be used to make molasses, which then can be spray dried and used as an ingredient in the novel fat-based confections according to the present method. Sweatings, the pulp or gel draining from cacao beans during fermentation can also be used in the present method and products. The sweatings may also be homogenized, filtered, pressed, concentrated, and/or turned into molasses prior to spray drying.

In a twenty-second aspect of the present disclosure, any of the structure and functionality disclosed in connection with FIGS. 1-5 may be combined with any of the other structure and functionality disclosed in connection with FIGS. 1-5.

In light of the present disclosure and the above aspects, it is therefore an advantage of the present disclosure to provide a novel method of preparing fat-based confectionery.

The advantages discussed herein may be found in one, or some, and perhaps not all of the aspects disclosed herein. Additional features and advantages are described herein, and will be apparent from, the following Detailed Description and the Figures.

DETAILED DESCRIPTION

Figure 1:
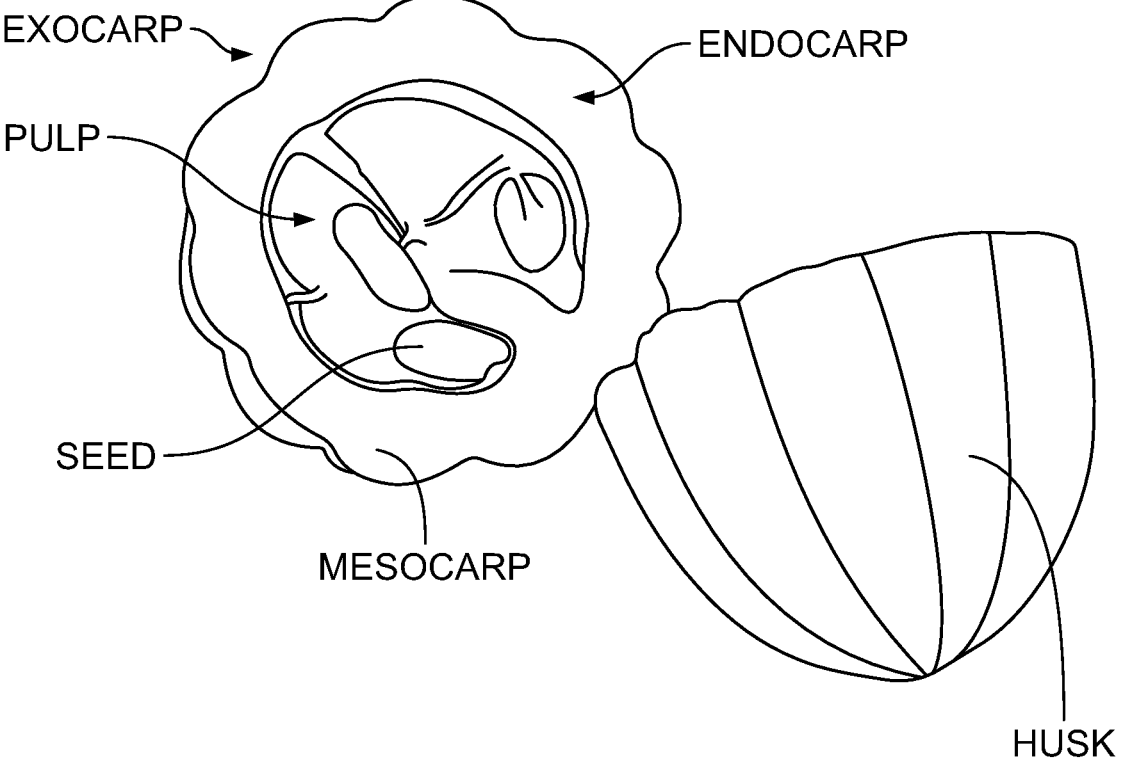
FIG. 1 is an illustration of the composition of the cacao seed pod from the *Theobroma cacao* plant.

The present disclosure relates novel methods of making fat-based confectionery compositions, including chocolates, as well as novel sugars and other ingredients suitable for use in confectionery and food products.

The methods comprise creating a dispersion of fat-based confectionery ingredients of a specific particle size. The dispersion may be further modified or processed, including by the addition of other ingredients. In an aspect, the dispersion may be itself used as an ingredient in food or confectionery compositions.

Cocoa beans derived from the fruit pods of *Theobroma cacao* are the principal raw material for chocolate production. The cocoa beans are surrounded by a mucilaginous pulp inside the pods. After the pods are harvested, the cocoa beans (usually including at least a portion of the surrounding pulp) are recovered from the pods, while a substantial portion of the pulp may become a waste product.

In addition to providing efficient new methods for preparing small batch, fine flavor or single origin chocolates and other confections, this method is particularly suitable for preparing chocolates and other confections comprising spray dried cacao pulp or other fruit or vegetable material as an ingredient. Patent Application No. 62/961,562 is wholly incorporated herein by reference. The cacao pulp may be a replacement for sugar or another sweetener, may add flavor, or may be a bulking agent or provide other benefits to the composition.

The terms "cocoa" and "cacao" as used herein are considered as synonyms.

As used herein, the term 'confectionery product' or 'fat-based confectionery product' is to be understood as meaning a chocolate product conforming to the applicable country-based standard of identity, including but not limited to U.S. Standards Of Identity (SOI), European Standards of Identity, CODEX Alimentarius, and the like, as well as non-conforming chocolates and chocolate-like products, (e.g. comprising cocoa butter replacers, cocoa butter equivalents or substitutes), compound chocolate, a coating chocolate, a chocolate-like coating product, a coating chocolate for ice-creams, a chocolate-like coating for ice-cream, a praline, a chocolate filling, a fudge, a chocolate cream, an extruded chocolate product or the like. The fat-based confectionery product may be a white chocolate; the white chocolate comprising sugar, milk powder and cocoa butter without dark cocoa solids. The product may be in the form of an aerated product, a bar, or a filling, among others. The chocolate products or compositions can be used as coatings, fillers, enrobing compositions or other ingredients in a finished or final food or confectionery product. The confectionery product of the invention may further contain inclusions such as nuts, cereals, and the like.

In an alternative aspect, the method may be used to produce certain also non-fat-based confectionery products such as conventional sugar confectionery such ice creams, gummies, fruit candies, and the like.

In an aspect, material prepared using this method may be used as ingredients in other confectionery or in savory food products.

In accordance with the present method, a mixture of cocoa butter, cocoa pulp, lecithin is spray dried in accordance with the disclosure herein. In another aspect, cocoa powder, cocoa liquor, and/or dairy powder are spray dried in combination with the other ingredients or a subset of ingredients.

The ingredients are mixed together to create a fat emulsion, and then spray dried to remove the moisture. The fine suspension is kept warm to crystallize the sugars, and then centrifuged to remove the excess of fat.

Spray Drying

Spray drying is a unit operation by which a liquid product is atomized or sprayed in hot air to instantaneously obtain powder. The physicochemical properties of the final product mainly depend on inlet temperature, air flow rate, liquid feed rate, droplet size distribution, spray nozzle pressure, type of carriers and their concentration.

The ingredients that are spray dried can be divided into two main groups, non-sticky and sticky. Non-sticky materials can be easily spray dried using a simple dryer design and the final powders remains free flowing. However, sticky materials such as sugar or acid rich materials pose a technical challenge in that they stick on the interior wall of the dryer or they may get transformed into unwanted agglomerates in the dryer chamber and conveying systems. These issues lead to operating problems and low product yield.

Low product yield from poor powder recovery may be caused by the presence of low molecular weight sugars (glucose, fructose and sucrose) and organic acids (citric, malic, and tartaric) such as those found in cacao pulp.

Without being bound by theory, the high hygroscopicity (the measurement of a material's ability to absorb or release water as a function of humidity, i.e. water activity), thermo-plasticity (measure by which a material can become soft when heated and hard when cooled without changing prop-erties) and the low glass transition (Tg) of these low molecu-lar weight substances contribute to the stickiness problem. Glass transition is the main characteristic transformation temperature of the amorphous phase.

Figure 2:
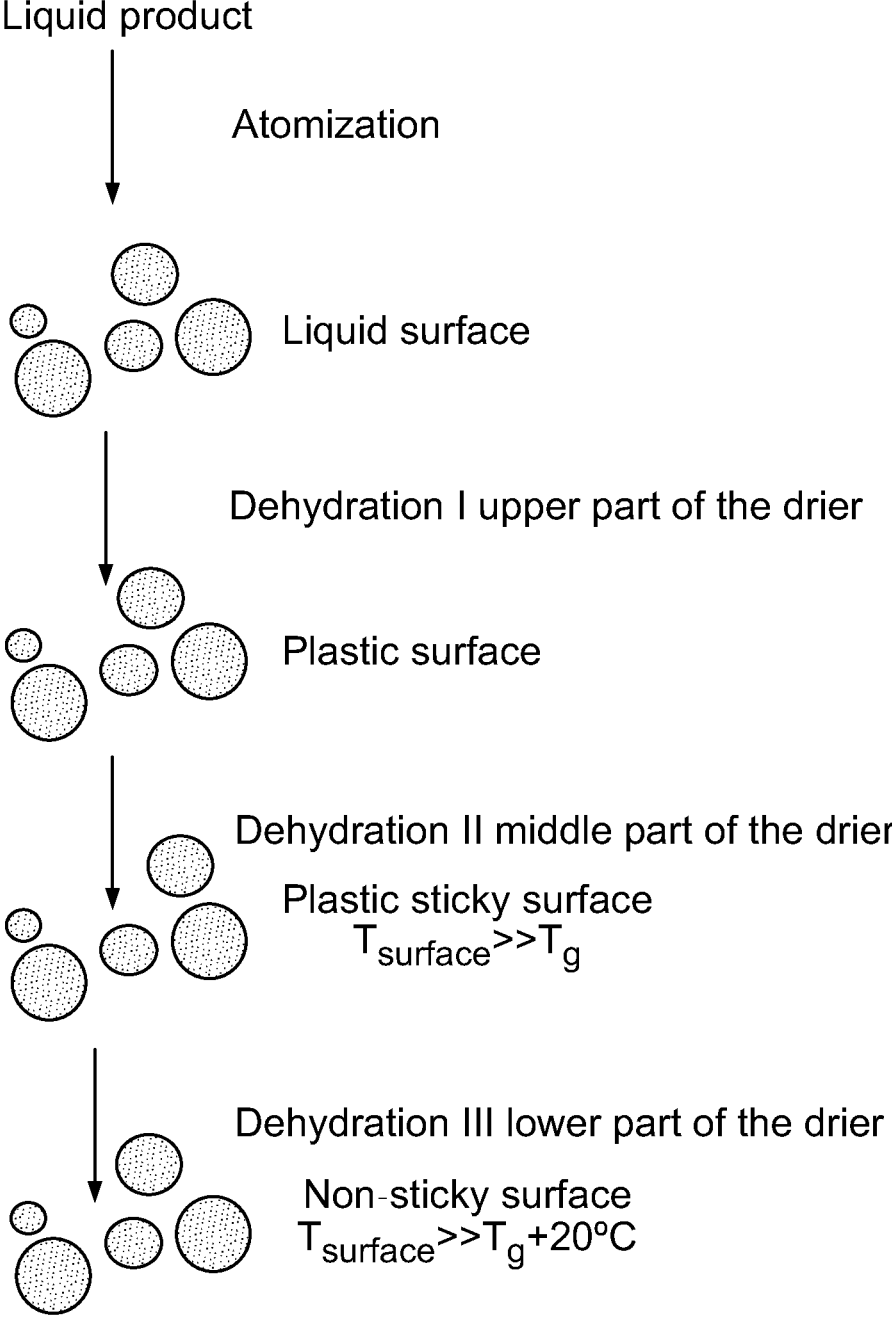
FIG. 2 is a schematic representation of physical changes of droplets during spray drying process (dehydration I, II and III represent the arbitrary stages of dehydration). $T_g$ are glass transition temperatures, and $T_{surface}$ is the temperature of drying particle.
Figure 3:
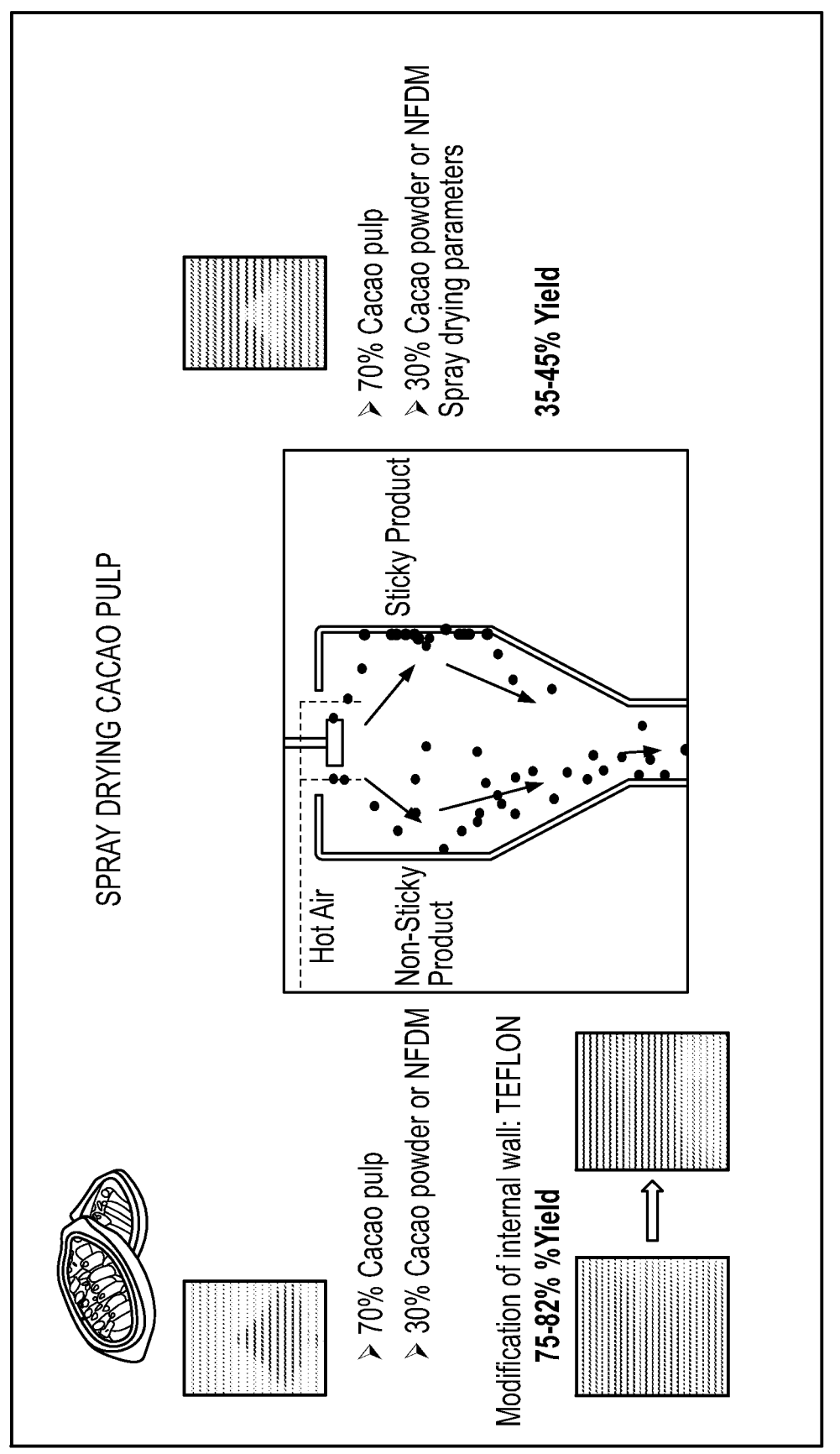
FIG. 3 is a representation of the spray drying process for the novel chocolate making method, comprising spray drying chocolate ingredients, including cacao pulp with a cocoa powder or non-fat dried milk carrier.

The glass transition event occurs when a hard, solid, amorphous sugar undergoes a transformation to a soft, rubbery liquid phase. As shown in FIG. 2, the first step of spray drying is atomization of feed. Normally a concentrate solution or emulsion is atomized or sprayed into fine drop-lets of the range of 20-50 microns diameter. As water evaporates, the solutes in the droplets become concentrated. The physical state of the product changes as it passes through the drier from solution to syrup to solid form. The molecular mobility of these substances is high because of their low glass transition temperatures leading to issues at temperatures normally used in spray drying.

In surface energy terms, a solid glass will have low surface energy and will not stick to any other low energy solid surface. Due to the transition from glassy to rubbery state, the surface energy of the material increases and the molecules start interacting with the solid surface. In a food or confectionery product ingredient drying operation, the product is a liquid/rubbery state and due to the removal of water (plasticizer) the ingredient is converted to the glassy state. If the ingredient does not go through the transition due to a higher drying temperature than the glass transition temperature, the product will remain in a high energy sticky state.

Certain chocolate and other fat-based confectionery ingredients are sticky materials. Cacao pulp is one such example of a sticky material that may be used in the present method.

TABLE 1

| SUGAR | HYGRO-SOCOPIC-ITY (RELA-TIVE) | MELTING POINT (° C.) | APROX. SOLUBIL-ITY IN WATER 60° C. (% W/W) | Tg (° C.) | STICKI-NESS (RELA-TIVE) |
|---|---|---|---|---|---|
| Lactose | h | 223 | 35 | 101 | s |
| Maltose | hh | 165 | 52 | 87 | ss |
| Sucrose | hhh | 186 | 71 | 62 | sss |
| Glucose | hhhh | 146 | 72 | 31 | ssss |
| Fructose | hhhhhh | 105 | 89 | 5 | sssss |

In an aspect, the spray dryer used for the spray drying method of the present invention is surface coated with polytetrafluroethylene (PTFE), commercially known as Tef-lon®. In an aspect, the spray dryer surface is coated with polychlorotrifluoroethylene, perfluoroalkoxy, tetrafluoreth-ylene-perfluoropropylene or similar materials.

Ingredients for Use in the Novel Method

In an aspect, any ingredient suitable for use in the preparation of chocolate or other fat-based confectionery may be used in the novel method.

In an aspect, the ingredients comprise protein or fat. In an aspect, the protein or fat is sourced from cocoa butter, cocoa powder, milks, milk replacement products, or combinations thereof. In aspect, the protein is sourced from plant proteins, such as chickpea protein, pea protein, or other plant proteins.

In an aspect, no dairy is used in the preparation of the chocolate or fat-based confections of the novel method.

Ingredients in fat-based confectionery may have a high moisture content. In an aspect, particle size of the ingredi-ents is reduced by lowering the feed rate, increasing the spray nozzle pressure, decreasing the air flow rate, and/or increasing drying time. In an alternative aspect, other pro-cessing methods of reducing the moisture content were used.

In an aspect, the liquid feed flow rate for the spray drying method is increased when a carrier is used. In an alternative, the liquid feed flow rate is decreased.

Sugar will rarely crystallize during a spray-drying pro-cess. In this process, sugar is dissolved in aqueous solution and sprayed as droplets. While exposed to hot air, the water leaves the solution quickly, and although the solution becomes supersaturated, the crystallization kinetics are too slow for the sugar molecules to form a crystal during drying. As the mobility of the sugar molecules decrease with the lack of water, an amorphous phase is formed. When the sugar is collected at the bottom of the dryer, its temperature is lower than its glass transition temperature (Tg), which keeps it amorphous. Crystallization is further inhibited due to the impurities in the system (surfactants, stabilizers, film formers, etc.). In pulp, the presence of glucose and fructose will significantly inhibit the crystallization of sucrose. Amorphous sugar can crystallize later, when exposed to higher temperature (e.g. when processed in chocolate) or humidity. This is uncontrollable crystallization that gener-ates large agglomerates, generating undesirable texture.

In order to enable crystallization one can slow down the drying process (difficult in spray dryers), or ensure that the particles stays above the Tg for sufficient time (for example, several minutes) to allow the particles to crystallize. Here, the risk is of residual moisture being released from the particles, which may create stickiness. Crystallization from amorphous material should be done in a dry environment while keeping particles flowing apart and separately.

In an aspect, ingredient particles are crystallized sepa-rately.

Spray Drying Parameters

In an aspect, the spray drying methods comprise using an inlet temperature from about 100° C. to about 205° C., and the outlet temperature from about 40° C. to about 105° C. In one aspect, the spray drying inlet temperature will be from about 100° C. to about 150° C. In another aspect, the inlet temperature will be from about 110° C. to about 200° C., or from about 120° C. to 180° C. or from about or from about 150° C. to 180° C. or from about 170° C.-190° C. or from 120° C.-140° C., or from 125° C. to 135° C. In another aspect, the outlet temperature will be from about 90° C. to about 105° C. or from 50° C. to 100° C., or from 50° C. to about 80° C., or 80° C. to 100° C., or from 55° C. to 75° C., or from 70° C. to 80° C., or from 80° C. to 90° C.

In an aspect, the air pressure used in the spray drying is 10 to 60 PSI. In an aspect, the air pressure is 20 to 50 PSI. In an aspect, the air pressure used in the spray drying method is constant.

In an aspect, the air flow rate for the spray drying method is increased when a carrier is used. In an alternative, the air flow rate is decreased.

In an aspect, a nozzle with a wide spray drying angle was used for the spray drying process. In an alternative aspect, nozzles with a narrow spray drying angle were used.

In an aspect, after spray drying, the ingredients do not need to be milled, conched or otherwise processed prior to use as an ingredient in a food or confectionery product.

In an aspect, after spray drying, the ingredients need less milling, conching, refining or other processing.

Sugars

Traditionally, sugars used in the preparation of fat-based confectionary require substantial processing. Unexpectedly, preparing the sugars using the presently disclosed method allows for less processing before use as an ingredient in recipes for standard fat-based confections.

Unexpectedly, the preparation of the emulsion in accordance with the presently disclosed methods is important to generate fine sugar of an appropriate particle size to produce a sweetener acceptable for use in fat-based confections without substantial further processing.

In an aspect, sugar syrup of approximately 40-90 brix is sprayed into a dryer while molten cocoa butter flows down the walls of the dryer. The sediments are then collected an centrifuged.

In an aspect, sugars are mixed with cocoa butter using a high shear mixer. In an aspect, about 30% sugar syrup, about 70% cocoa butter, and a small amount of lecithin are spray dried. The material accumulated at the bottom of the dryer is then centrifuged to produce a sugar and fat ingredient for further use in confectionery products. In an aspect, the resulting particle size is less than 30 microns and may be directly used in chocolate processing without further milling. In an alternative aspect, the ingredient is further milled to reduce particle size.

The sugars may be any known sugar or other sweetener capable of being formed into a syrup.

The sugar syrup and cocoa butter can be mixed into the emulsion with cocoa powder, dairy powder or any other powdered ingredient.

The resulting compositions may be used for coating applications or tempered for molding applications.

In an aspect, the resulting emulsion may be sprayed onto nuts, fruits or other centers as a coating.

In an aspect, the resulting material may be agglomerated. In an aspect, the material produced from the novel methods may be agglomerated into fat-dissolving liquid applications.

Carriers and Emulsifiers

In the presently disclosed method, ingredients traditionally found in confectionery products as a carrier. For example, if the product desired is a fat-based confectionery product, the ingredients may be spray dried on a cocoa powder carrier. In an aspect, the carrier may be cocoa butter or a component of cocoa butter. The carrier may be prepared from another component of the cacao pod as well, such as fiber from the cacao pod husk.

Figure 4:
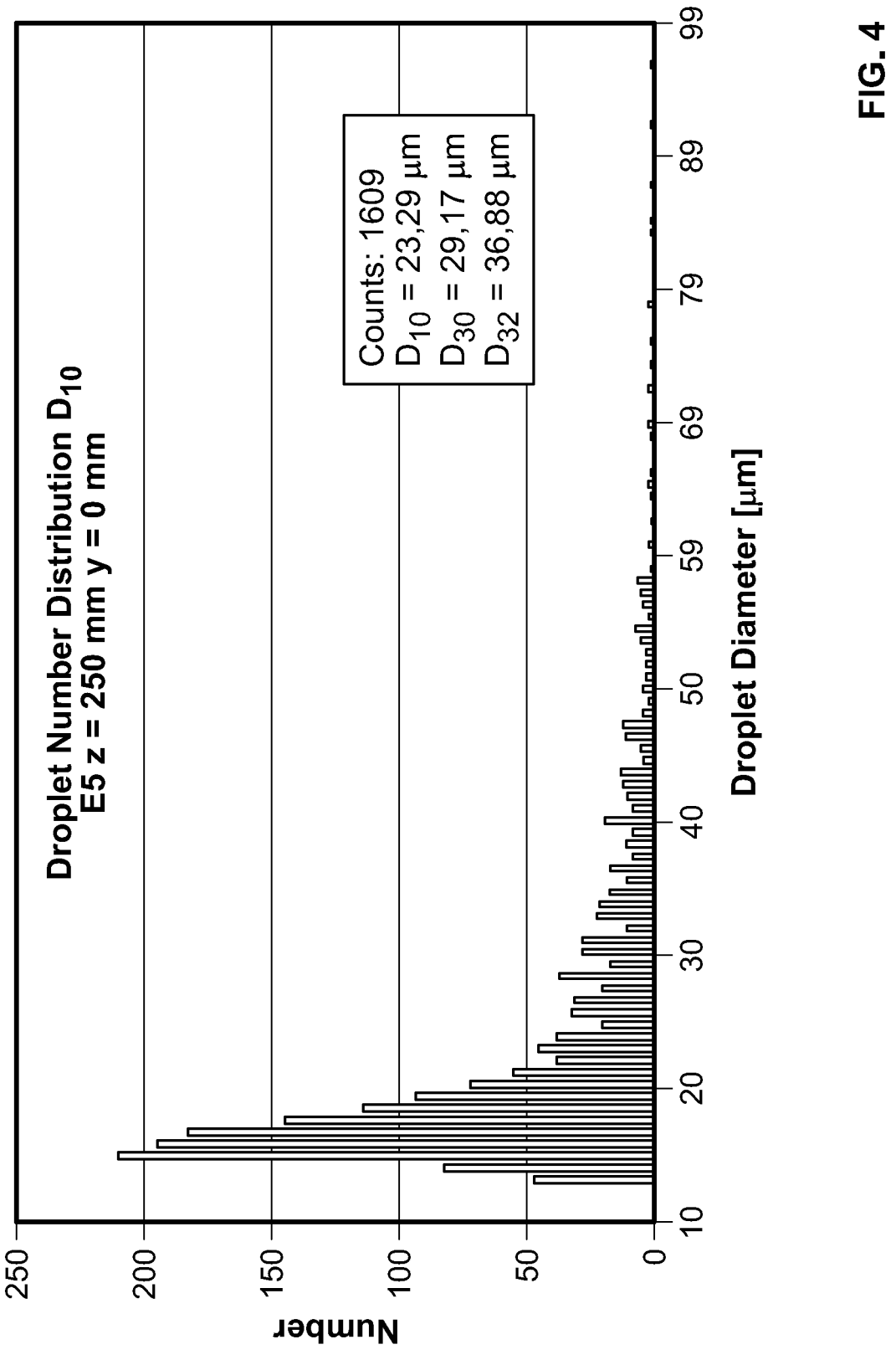
FIG. 4 is a representation of the particle size distribution of the sprayed cocoa butter emulsion.
Figure 5:
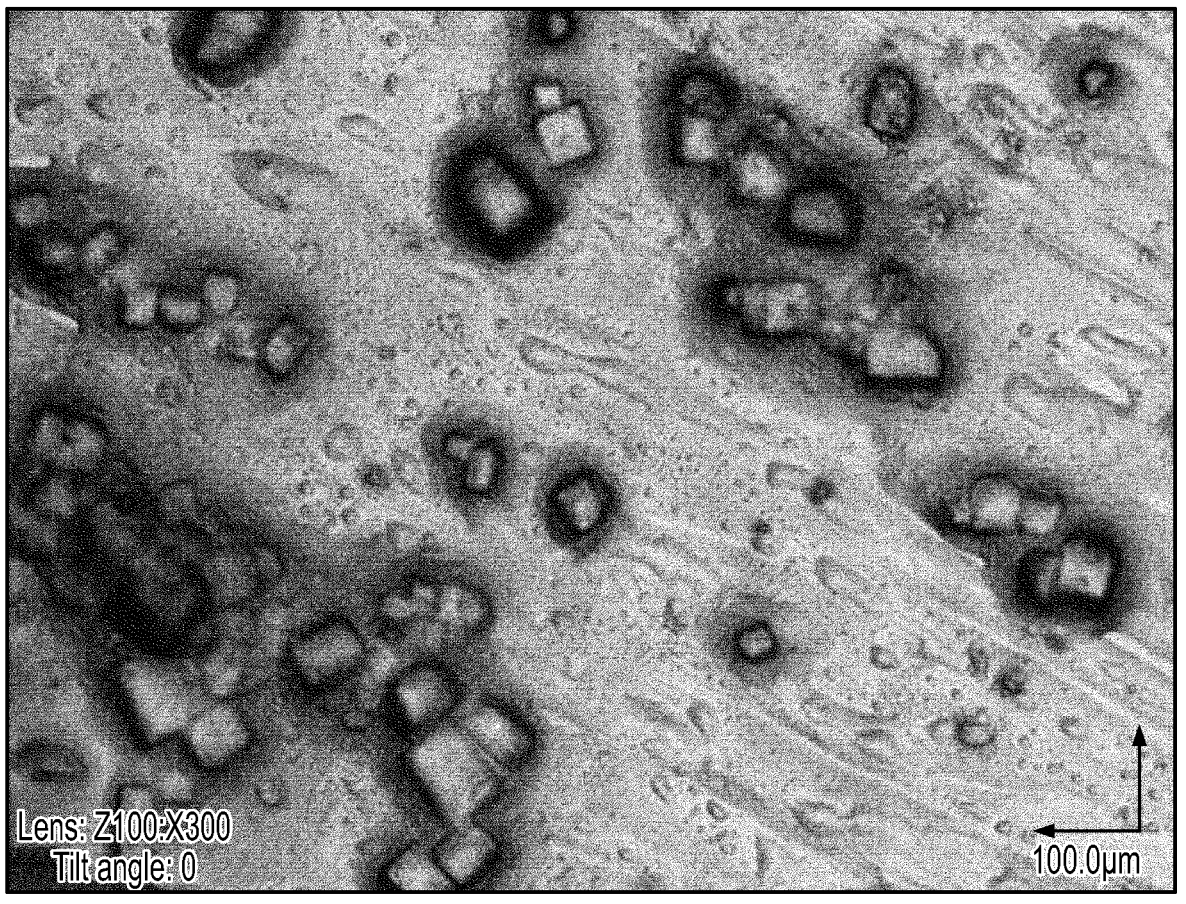
FIG. 5 is an image of crystallized sugar in a cocoa butter matrix.

The carrier may also be molten cocoa butter. In that case, an emulsion of the pulp and molten cocoa butter is formed using high shear mixer. As show in FIG. 4, the emulsion is sprayed as very small droplets. The drying air removes the moisture from the droplets, and the solids stays inside the fat matrix. As droplets are less than 30 microns, the solids will be captured in the fat matrix as very small particles. The suspension of sugars in fat will deposit at the bottom of the dryer. It is kept warm to allow it to crystallize, while the particles stay separate as shown in FIG. 5. The end result is fine crystallized sugar particles (less than 30 microns) in cocoa butter. This can be used directly in the chocolate process without refining, and with minimum conching.

For example, in a milk chocolate product, the ingredients requiring a carrier may be spray dried on a dairy derived or milk powder carrier such as non-fat dried milk powder. The milk powder carrier may be skim milk, 1% milk, 2% milk, whole milk or combinations thereof. The milk may be sourced from any milk producing animal. The milk powder carrier may be a milk powder replacement carrier, e.g., made with a milk replacement product such as soy milk, nut milks including cashew milk and almond milk, oat milk or combinations thereof. The cacao pulp may be spray dried with multiple carriers, such as both cocoa powder and milk powder, or cocoa powder and cocoa butter, or milk powder and cocoa butter or combinations thereof.

Alternatively, the material prepared by the present method may be spray dried using cocoa butter as a carrier and the subsequent resulting material may be used as an ingredient in milk chocolates and milk based confectionery products.

The carrier may be a soft fat, such as fractions of palm, palm kernel, coconut and shea, and blends thereof.

The carrier may also be whey protein, sodium caseinate or oat protein. In an aspect, the carrier may be a sugar or sugars. In an aspect, the carrier may be cocoa butter and a sugar. In an aspect the carrier may be cocoa powder and a sugar.

In an aspect, the carrier may be combined with emulsifiers such as polyglycerol polyricinoleate, or any other commercially acceptable emulsifier. In a preferred aspect, the emulsifier may include lecithin derived from vegetable sources such as soybean, safflower, corn, etc., fractionated lecithins enriched in either phosphatidyl choline or phosphatidyl ethanolamine, or both, mono- and digylcerides, diacetyl tartaric acid esters of mono- and diglycerides (also referred to as DATEM), monosodium phosphate derivatives of mono- and diglycerides of edible fats or oils, sorbitan, monostearate, hydroxylated lecithin, lactylated fatty acid esters of glycerol and propylene glycol, polyglycerol esters of fatty acids, propylene glycol mono- and di-esters of fats and fatty acids, or emulsifiers that can become approved for the US FDA-defined soft candy category. In addition, other emulsifiers that can be used include ammonium salts of phosphatidic acid (e.g., YN), sucrose esters, oat extract, etc., any emulsifier found to be suitable in chocolate or similar fat/solid system or any blend.

In an aspect, the carrier is an ingredient commercially acceptable for inclusion in a fat-based confectionery product. For example, in an aspect, the carrier is a nut-meat powder sourced from any commercially acceptable nut. In another aspect, the carrier is isolated solids or flours derived from nuts.

In an aspect, the ratio of spray dried ingredients other than the carrier to the carrier is present in a weight ratio of about 40:60. In an aspect, the weight ratio is about 70:30. In an aspect, the ratio is about 80:20. In an aspect, the ratio is about 50:50 by weight.

In an aspect, the solid content of the spray dried material is about 10% to 50% solids. In another aspect, the solid content of the spray dried material is about 10% to 30% solids, or about 15% to 30% solids, or preferably about 15% to 25% solids.

In an aspect, the method is used to produce a non-fat based confectionery product. In addition to the carriers described above, the carrier may be acacia gum (e.g., gum Arabic), starches, modified starches, maltodextrins, corn syrup solids, alginates, agar, gelatin, methyl cellulose, cyclodextrin, or other carriers or combinations thereof. In one aspect, the acacia gum is gum arabic (from Acacia Senegal). In another aspect, the carrier may be a plant protein, such as a chickpea, pea or other plant protein.

In an alternative aspect, the carriers described for use for non-fat based confectionery products may be used for fat-based confectionery products.

In an aspect, the presently disclosed spray drying methods yield a confectionery composition with high levels of micronutrients, including antioxidants such as polyphenols. In an aspect, the presently disclosed methods may be used to produce a composition with taste masking properties to allow for the use of harsh liquors that may be otherwise unacceptable in confections.

In an aspect, the presently disclosed spray drying methods yield a spray dried confectionery composition with less than about 10% moisture. In an aspect, the spray dried confectionery composition has less than about 8% moisture. In yet another aspect, the moisture level in the confectionery composition is less than about 5%. In an aspect, the moisture level is less than 1.5%. In a preferred aspect, the moisture level is less than 1%.

Preparation of Confectionery Products

In an aspect, the novel spray dryer method is used in the production of fat-based confectionery products, such as chocolate products.

In an aspect, fat-based confectionery products are prepared from cocoa beans. The roasted cocoa beans may be further roasted and winnowed to generate a nib that is converted to cocoa liquor or cocoa butter. The nib or cocoa liquor may be converted to cocoa powder. The liquor, cocoa butter, and nib may be mixed with sugar or other natural or synthetic sweetening substances, either alone or optionally with other ingredients suitable for used in fat-based confectionery. These ingredients are then added to the spray dryer, dried in accordance with the parameters disclosed herein, and then centrifuged.

In this spray dryer method, all ingredients, carriers, and other preparations disclosed above may expressly be combined with this method. For example, in an aspect, the cocoa liquor, cocoa butter and spray dried cacao pulp, optionally with other ingredients may be combined in a spray dryer.

All the ingredients in a standard chocolate recipe may be combined in a spray dryer and spray dried in accordance with the parameters described herein. In a preferred aspect, cocoa liquor, cocoa butter, lecithin and cocoa pulp are spray dried.

In an alternative aspect of the spray dryer method, sugar may be added. The sugar may be added in the form of a sugar syrup. In an alternative aspect, fruits other than cacao pulp may be added to the spray dryer.

After an emulsion is formed, the material is kept warm at temperatures appropriate to allow for crystallization of the sugars present in the material. The material is kept warm for a sufficient amount of time to allow for crystallization. For example, where sucrose is present, the material is kept warm to at least 62° C. for about five to ten minutes until the material is crystallized.

The ingredients may then be centrifuged. The centrifuged material, the spray dried product, may be identified as, including, but not limited to, a chocolate, a compound chocolate, or a chocolate-like substance. In an alternative aspect, the end product is a non-fat based confectionery product.

The material may be formed into bars, truffles, centers, lentils, tablets, or other shapes appropriate to fat-based confections. The centrifuged material may alternatively be used as an ingredient in other confectionery or food products.

In an aspect, the centrifuged material may be used to produce fine flavor chocolate, premium chocolate, small batch chocolates, 100% cacao chocolates, or single origin chocolates.

The centrifuged material may be further processed and used as an ingredient in other edible products.

In an aspect, fat-based confections produced by the present method may a high ratio of cocoa liquor to sugar, including predominantly cocoa liquor. In an aspect, the ratio of cocoa liquor to sugar is 6:4 or 7:4 or 8:4 or higher.

In an aspect, the spray dried product has a ratio of fat to particles between 70:30 to 30:70. Preferably, the ratio is between 50:50 to 60:40.

In an aspect, the spray dried product comprises cocoa pulp to replace sugar in the fat-based confectionery product. In an aspect, the fat-based confectionery product does not include any additional sugar. In an aspect, the product does not include any refined sugar.

The spray dried cacao pulp may also be used to replace all or some sugar in foods or in non fat-based confectionery.

In an aspect, the product may comprise spray dried cacao pulp to replace texture agents such as gelatin, pectin, starches, or the like.

In an aspect, fruit or vegetable material may be spray dried with cocoa butter.

Prior to spray drying the fruit or vegetable material, the material is ground so that any components that are not water or fat soluble have a particle size of 30 microns or less.

The fruit or vegetable material spray dried with the cocoa butter may be subject to additional processing to reduce the particle size to less than 30 micron, e.g. 20 micron, or 10 micron. The additional processing may include milling steps or refining steps.

In an aspect, the fruit material used in the spray drying method may replace some or all of the added sugar in the resulting confectionery composition. In an aspect, the fruit material may replace the refined sugar.

In an aspect, the fruit or vegetable material may be strawberry, raspberry, blackberry, blueberry, guava, persimmon, pineapple, apple, mango, banana, beet, carrot, chayote, kale, pears, grapes, peas, boysenberries, lingonberries, peppers, melons, potatoes, parsnips, yams, sweet potatoes, potatoes, tomatoes, papaya, citrus fruits, pumpkins, squashes, nectarines, peaches, plums and other stone fruits and other fruits and vegetables not listed herein.

In an aspect, the fruit or vegetable material may also be pulp derived from any species of the genera *Theobroma* or *Herrania* or inter- and intra-species crosses thereof within those genera, and more preferably from the species *Theobroma cacao* and *Theobroma grandiflorum*. The species *Theobroma cacao* as used herein comprises all genotypes, particularly all commercially useful genotypes, including but not limited to Criollo, Forastero, Trinitario, Arriba, Amelonado, Contamana, Curaray, Guiana, Iquitos, Maranon, Nacional, Nanay and Purus, and crosses and hybrids thereof. The material may also be other pulps traditionally considered waste, such as the pulp of cashew apples and coffee cherries.

The presently disclosed subject matter may be additionally understood by reference to the following Examples, which are provided as exemplary of the invention, and not by way of limitation.

EXAMPLES

Example 1—Spray Dryer Method Chocolate Comprising Spray Dried Cacao Pulp

In accordance with an aspect of the present invention, a chocolate comprising spray dried cacao pulp was prepared in a spray dryer.

The following material was added into the spray dryer: 3000 grams cocoa butter, 400 grams cocoa liquor, 2000 grams of cocoa pulp, and additionally cocoa butter were added into the spray dryer. Optionally, lecithin was added. The material was mixed to create a fine water in oil emulsion.

Prior to spraying, the material was kept at 50° C.

The material was spray dried at an inlet temperature of 130-160° C. The material was spray dried for less than ten seconds, preferably for less than five seconds. The resulting suspension of fine particles in fat was kept at temperature above the glass transition temperature of the sugars for about ten minutes to allow crystallization to occur.

The resulting emulsion was centrifuged to remove the excess fat. The resulting material had a moisture level of less than 1.0 and a fine particle size resulting in a smooth chocolate.

The chocolate had the following composition:

| Moisture content | 1.0 by Karl Fischer Titration |
| Particle size | 30 micron |
| Sugar content (all sugars naturally occurring from spray dried cacao pulp with no added sugar) | ~28% |
| Fat content | ~50% |
| Cocoa Liquor | ~34% |
| Lecithin | Less than 1% |

The material produced herein may be further processed, through milling or other processing to achieve a smaller particle size distribution.

The produced material is suitable for consumption as a final product or alternatively may be used as an ingredient to produce confectionery products.

Example 2—Spray Dried Cacao Pulp with Cocoa Butter for Use as an Ingredient

Cacao pulp was combined with molten cocoa butter and lecithin in a high shear mixture to achieve a water-in-oil emulsion. The emulsion was kept at temperature above 70° C., and then spray dried at 65° C.-140° C. (air inlet temperature). After drying and water removal, the process yielded a suspension of fine solids (sugars, pectin and other pulp ingredients) in molten cocoa butter. The suspension was kept warm for 15 minutes to allow the sugars to crystallize and for the excess of moisture to evaporate. The continuous matrix of fat kept the particles apart and eliminated aggregation, which resulted in fine crystals. The suspension then was centrifuged to remove access of cocoa butter. After the majority of the cocoa butter was removed, the concentrated suspension was used in chocolate formulation.

As an ingredient, when combined with cocoa liquor, the material produced from this method mitigates harsh notes in the liquor.

The material may alternatively be used as an ingredient in other confections.

Other fruit pulps, such as the pulp of *Theobroma grandiflorum* may be combined with cocoa butter as described herein. These products may likewise be added as ingredients to fat-based and non-fat based confectionery and food products.

Example 3—Ice Cream

In accordance with an aspect of the present invention, ice cream was prepared in the spray dryer by spraying ingredients of an ice cream composition in chilled conditions, creating a water in fat emulsion.

The ingredients were sprayed in a spray dryer and then centrifuged. Sticks or handles were inserted to allow the ice cream to be consumed.

Example 4—Preparation of Fruit Confections Using the Novel Method

In accordance with an aspect of the present invention, a fruit confection was prepared.

1000 grams of strawberry material was added to a blender along with 1500 grams of cocoa butter. The material was added into the spray dryer and spray dried to create a water in fat emulsion. The resulting suspension of fine particles in fat was kept at temperature above the glass transition temperature of the fruit sugars to allow crystallization to occur.

The resulting material was then centrifuged to remove excess fat, yielding a fruit confection with a particle size of less than 30 micron and fat to water base of 2:1.

In accordance with an aspect of the present invention, the same process described for strawberry was followed, instead using 1000 grams of banana.

Example 5—Preparation of Chocolate Fruit Confections Using the Novel Method

In accordance with an aspect of the present invention, a chocolate fruit confection is prepared.

1500 to 2000 grams of strawberry material is added to a blender along with 1500 grams of cocoa butter and 2500 to 3000 grams of cocoa liquor. The material is added into the spray dryer and spray dried to create a water in fat emulsion. The resulting suspension of fine particles in fat was kept at temperature above the glass transition temperature of the fruit sugars to allow crystallization to occur.

Although no sugar is added to the fruit confection, sensory testing of the confection surprisingly demonstrates that the strawberry confection is perceived as sweeter than similar confections comprising added sugar.

The resulting material was then centrifuged to remove excess fat, yielding a fruity chocolate confection with a particle size of less than 30 micron.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of preparing a confectionery composition, wherein the confectionery composition is prepared by:

combining chocolate ingredients within a spray dryer to form a water-in-fat emulsion having an average particle size of less than 30 microns, wherein the chocolate ingredients comprise cocoa pulp and natural sugars contained therein and further comprise cocoa butter, cocoa liquor, or combinations thereof, wherein no additional sugars are added;

spray drying the water-in-fat emulsion to remove moisture and form a powder suspension;

heating the powder suspension to a temperature of at least 62° C. for a time sufficient to crystallize the natural sugars; and centrifuging the powder suspension to remove excess fat and form the confectionery composition.

2. The method of claim 1, wherein the spray drying occurs at an inlet temperature of 120° C. to 180° C.

3. The method of claim 1, wherein the spray drying occurs at an outlet temperature of 60° C. to 100° C.

4. The method of claim 1, wherein the spray drying occurs in a spray dryer coated with polytetrafluroethylene.

5. A confectionery composition produced by the method of claim 1.

6. A fat-based confectionery product comprising the confectionery composition of claim 5.

7. The method of claim 1, wherein the chocolate ingredients are combined with lecithin within the spray dryer.

8. The method of claim 1, wherein the suspension is kept at a temperature above the glass transition temperatures of the ingredients in the suspension prior to centrifuging.

9. The confectionery composition of claim 5, wherein the confectionery composition is an ice cream.

10. The method of claim 1, further comprising forming the confectionery composition into bars, truffles, centers, lentils, or tablets.

\* \* \* \* \*